(12) United States Patent
Raspl et al.

(10) Patent No.: US 8,219,999 B2
(45) Date of Patent: Jul. 10, 2012

(54) SYSTEM AND METHOD FOR DETERMINING A NUMBER OF THREADS TO MAXIMIZE UTILIZATION OF A SYSTEM

(75) Inventors: Stefan Raspl, Bondorf (DE); Dirk Seider, Grosselfingen (DE)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 12/183,097

(22) Filed: Jul. 31, 2008

(65) Prior Publication Data

US 2010/0031266 A1   Feb. 4, 2010

(51) Int. Cl.
*G06F 9/46* (2006.01)
(52) U.S. Cl. ............. 718/105; 718/1; 718/100; 718/107
(58) Field of Classification Search .................. None
See application file for complete search history.

(56) References Cited

U.S. PATENT DOCUMENTS

| | | | |
|---|---|---|---|
| 6,477,561 B1 * | 11/2002 | Robsman | 718/105 |
| 2008/0033900 A1 * | 2/2008 | Zhang et al. | 706/52 |

OTHER PUBLICATIONS

Sutter, Herb. The Free Lunch Is Over: A Fundamental Turn Toward Concurrency in Software. [online]. 8 pages. [retrieved on May 5, 2008]. Retrieved from the Internet:< URL: http://www.gotw.ca/publications/concurrency-ddj.htm>.

* cited by examiner

*Primary Examiner* — Emerson Puente
*Assistant Examiner* — Dong Kim
(74) *Attorney, Agent, or Firm* — Schmeiser, Olsen & Watts; Elissa Wang

(57) ABSTRACT

A system and associated method for determining a number of threads to maximize system utilization. The method begins with determining a first value which corresponds to the current system utilization. Next the method determines a second value which corresponds the current number of threads in the system. Next the method determines a third value which corresponds to the number of processor cores in the system. Next the method receives a fourth value from an end user which corresponds to the optimal system utilization the end user wishes to achieve. Next the method determines a fifth value which corresponds to the number of threads necessary to achieve the optimal system utilization value received from the end user. Finally, the method sends the fifth value to all running applications.

10 Claims, 2 Drawing Sheets

SYSTEM AND METHOD FOR DETERMINING A NUMBER OF THREADS TO MAXIMIZE UTILIZATION OF A SYSTEM

BACKGROUND OF THE INVENTION

The present invention relates generally to application threads and more particularly to determining an optimum number of application threads.

As the prevalence of multicore processors increases so too will the development of multithreaded applications. However, multithreaded applications suffer from the fact that determining the optimum number of threads depends largely on the number of processor cores as well as application characteristics in a given landscape.

Too many threads and multithreaded applications may experience lag due to over-fragmentation. Simply put, too many threads are vying for a finite number of clock cycles. Too few threads and a multithreaded application may never achieve full utilization of the available cores.

Conventional attempts to solve this problem include creating as many threads as cores in a given landscape. However in a worst case scenario, all threads may perform a remove periphery at the same time resulting in sub-optimum processor utilization. Another attempt involves dynamically creating and removing threads. Nonetheless this requires a system performance framework to evaluate the impact of additional threads. This, and dynamic creation and deletion of threads has additional drawbacks.

SUMMARY OF THE INVENTION

The present invention provides a method for determining a number of threads to maximize utilization of a system, the method comprising:

determining a first value, said first value equaling a percentage of time in which said system is not waiting for instructions from at least one application;

determining a second value, said second value equaling a number of threads interacting with said system, said threads having been created by said at least one application;

determining a third value, said third value equaling a number of processor cores residing within said system;

receiving from an end user a fourth value, said fourth value equaling a desired percentage of time in which said system is not waiting for instructions from said at least one application;

after said determining said first value and said determining said second value and said determining said third value and said receiving said fourth value, determining a fifth value, said fifth value equaling a number of threads which if the total number of threads interacting with said system were equal to said fifth value would result in said percentage of time in which said system is not waiting for instructions from at least one application being equal to said fourth value; said fifth value being a function of said first value and said second value and said third value and said fourth value; and after said determining said fifth value, sending said fifth value to said at least one application.

DETAILED DESCRIPTION OF THE DRAWINGS

Although certain embodiments of the present invention are described herein, it is understood modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
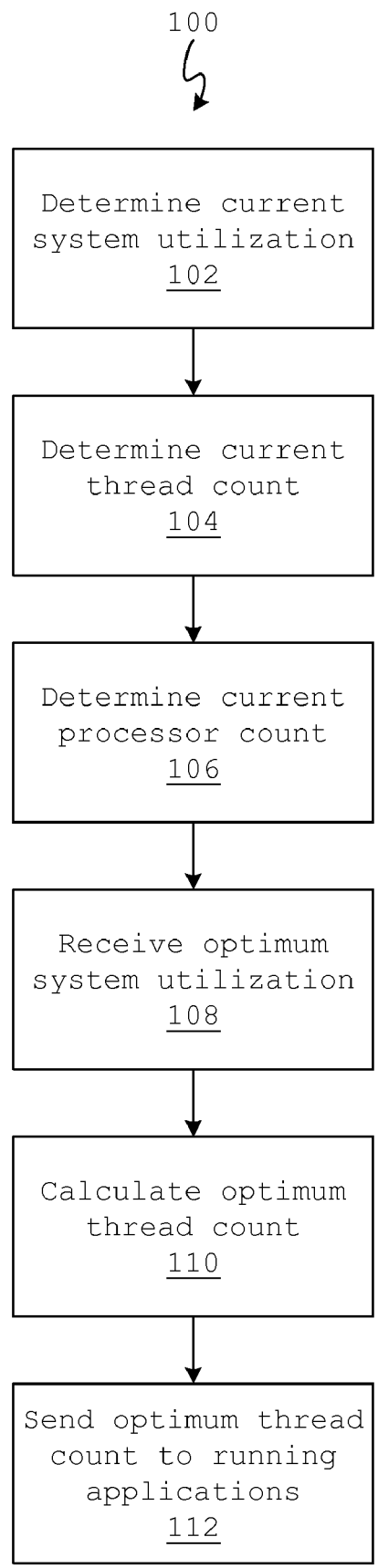
FIG. 1 illustrates a method for determining a number of threads to maximize system utilization, in accordance with embodiments of the present invention.

FIG. 1 illustrates a method 100 for determining a number of threads to maximize system utilization, in accordance with embodiments of the present invention. The method 100 begins with step 102 which determines the current system utilization.

Step 102 determines the current system utilization. The present invention may observe current system utilization by various means. In one embodiment of the present invention, determining current system utilization 102 is performed by observing the number of clock cycles the processors' cores spend processing data versus the number of clock cycles the cores spend idle, for a given period of time. For example, if during a period of time the cores perform calculations for 25 clock cycles and sit idle for 75 clock cycles, the current utilization is 0.25 or 25% utilization.

In an alternative embodiment of the present invention, determining current system utilization 102 is performed by identifying the speed of the processor(s) residing in the system, identifying the number of clock cycles a given set of instructions requires, and measuring the time necessary for the processor core(s) to perform the instructions. For example, the system utilizes a single processor with a clock speed of one billion cycles per second (1 GHz) and performs one billion instructions for the target application in two (2) seconds. Assuming no other application utilizes the core(s) during the two seconds, the current utilization is 0.5 or 50% utilization.

In another alternative embodiment of the present invention, the determination of current system utilization 102 may be performed by sending to the operating system (OS) a request for the current system utilization value and thereinafter receiving the current system utilization value from the OS.

While particular embodiments of determining the current system utilization are described herein for purposes of illustration, many modifications and changes will become apparent to those skilled in the art. After completion of step 102, the method 100 continues with step 104 which determines the current thread count for all active applications.

The present invention subscribes to the assumption that the absolute time during which no processor utilization takes place is invariant to the number of threads. For example, the current utilization for 1 thread is 0.25 or 25% and the 75% of idleness equals 3 seconds of processing time. After raising the number of threads so that the utilization is 99%, the duration in which a single thread idles is still 3 seconds. This assumption is for example met in client-server scenarios, where the application runs on a client and is idle while making calls to the server. Since the server is significantly bigger dimensioned than a client, the response time might remain constant while raising the number of threads.

Another example would be a system with hardware that is being called by the threads. If said hardware device is significantly bigger dimensioned than would be necessary to serve a few simultaneous requests, it can be assumed that response times will remain constant with increasing number of threads if the number of threads is not too high.

Step 104 determines the current thread count for all active applications. In one embodiment of the present invention, step 104 determines the thread count by polling each active application for the number of threads created therein. Each of the active applications would return the number of threads it manages and step 104 would calculate the summation of threads for the active applications.

In another alternative embodiment of the present invention, the determination of current thread count 104 may be performed by sending to the operating system (OS) a request for the current thread count value and thereinafter receiving the current thread count value from the OS.

While particular embodiments of determining the current thread count are described herein for purposes of illustration, many modifications and changes will become apparent to those skilled in the art. After completion of step 104, the method 100 continues with step 106 which determines the number of processor cores residing in the system.

Step 106 determines the number of processor cores residing in the system. In one embodiment of the present invention, step 106 determines the core count by sending to the operating system (OS) a request for the current core count value and thereinafter receiving the current core count value from the OS.

While particular embodiments of determining the current processor core count are described herein for purposes of illustration, many modifications and changes will become apparent to those skilled in the art. After completion of step 106, the method 100 continues with step 108 which receives an optimum system utilization value from an end user.

Step 108 receives an optimum system utilization value from an end user. The optimum system utilization represents the desired percentage of time the processor core(s) are not performing instructions for active applications. In one embodiment of the present invention, the optimum system utilization value is in the form of a decimal, for example 0.95. The value 0.95 corresponds to the core(s) performing instructions for active applications 95% of the time. After completion of step 108, the method 100 continues with step 110 which calculates the optimum thread count.

Step 110 calculates the optimum thread count. The optimum thread count represents the number of threads required to achieve a level of system utilization equal to the value received in step 108, supra. The optimum thread count is derived from a function applying the current system utilization value of step 102, the current thread count value of step 104, the current processor core count value of step 106, and the optimum system utilization value of step 108.

Specifically, the optimum thread count is calculated according to the function $$V_5 = \left( \frac{\ln(1 - V_4)}{\ln\left(1 - \left(\frac{V_1}{V_3}\right)\right)} \right) V_2,$$

where $V_5$ corresponds to the optimum thread count (the number possibly requiring rounding), $V_4$ corresponds to the optimum system utilization value of step 108, $V_3$ corresponds to the number of processor cores value of step 106, $V_2$ corresponds to the current thread count value of step 104, and $V_1$ corresponds to the current system utilization value of step 102.

The above stated formula is derived from the fact that the utilization of the system by the threads can be modeled as a binomial distribution: p is the probability that the application is using cycles (e.g. not idle) at a specific point in time, n is the total number of threads. Hence the probability P that the number of threads using cycles K at a specific point in time is k is:

$$P(K = k) = \binom{n}{k} p^k (1 - p)^{(n-k)}$$

Since the probability that at least 1 thread is using cycles at a specific point in time P(K>0) is identical to 1−P(K=0), we hold:

$$P(K>0)=1-(1-p)^n$$

Solving this equation to n yields the basis of the equation above. Other scenarios might need different distribution functions. Other distribution functions can be used to yield the respective formulas to determine the optimum number of threads, and this invention is not limited to binomial distribution-based functions.

After completion of step 110, the method continues with step 112 which sends the optimum thread count value $V_5$ to the running applications.

Step 112 sends the optimum thread count value $V_5$ to the running applications wherein the running applications can adjust their number of threads to ensure optimum system utilization.

In contrast to the dynamic approach where the number of threads is changed and the impact on the system monitored (which consumes additional cycles by itself), only the information of a single run is necessary. While said dynamic approach can cause corner cases where the number of threads will alternate between two or more values due to rounding errors, and is prone to unnecessarily change the number of threads due to brief periods of time with different system load, this approach will not be affected by any of these problems.

In an alternative embodiment of the present invention, the method 100 may send the optimum thread count value $V_5$ to the operating system wherein the operating system controls the number of threads being created by active applications. Thus by controlling the number of threads created by active applications, the operating system facilitates optimum system utilization. After completion of step 112, the method 100 ends.

In an alternative embodiment of the present invention, the method 100 forgoes the step 104 which determines the current thread count. In this alternative embodiment, the current thread count is already known since the user configured the application before or during startup with a specific thread count. Therefore, since the number of current threads is fixed and known, the step 104 is not necessary and therefore skipped.

In an alternative embodiment of the present invention, the method 100 repeats steps 102 through 112 cyclically according to a period of time provided by an end user. By repeating steps 102 through 112 cyclically, the present invention takes into account changing conditions in the computer system. For example, the utilization of a computer system may fluctuate between times of heave use and times of relatively minimal use throughout the day. By repeating the method 100, an optimum number of threads may be implemented depending on the current system utilization.

In another alternative embodiment of the present invention, the method 100 repeats steps 102, 104, 108, 110, and 112 cyclically according to a period of time provided by an end user. Moreover, step 106 (determining current core count) is specifically not repeated for there may be situations where the number of available processor cores does not change between successive instances of the method 100.

In another alternative embodiment of the present invention, the method 100 repeats steps 102, 106, 108, 110, and 112 cyclically according to a period of time provided by an end user. Moreover, step 104 (determining current thread count) is specifically not repeated for the present invention may utilize the optimum thread count calculated in step 110 of the previous instance of the method 100. Therefore, since the number of threads has not changed since the previous invocation of the method 100, the need to calculate the current thread count is unnecessary.

In another alternative embodiment of the present invention, the method 100 repeats steps 102, 108, 110, and 112 cyclically and according to a period of time provided by an end user. Moreover, steps 104 and 106 are specifically not repeated for the reasons provide supra.

In another embodiment of the present invention, the method 100 repeats steps 102, 104, 106, 110, and 112 cyclically and according to a period of time provided by an end user. Moreover, step 108 (receive optimum system utilization) is specifically not repeated since the optimum system utilization may not change between subsequent invocations of the method 100.

In another embodiment of the present invention, the method 100 repeats step 102, 104, 110, and 112 cyclically and according to a period of time provided by an end user. Moreover, the steps 106 and 108 are specifically not repeated for the reasons provided supra.

A feature of the present invention is the fact that the method 100 can optimize a single-core system as well as multi-core systems. This is due to the fact that even a single processor can become overloaded with threads forcing some threads to wait for processor time. Since each additional thread introduces an overhead to context switches, administering of threads in the operating system, etc., valuable cycles are wasted if the number of threads exceeds the optimum. Additionally, with too few threads created the processor cores may sit idly by waiting for additional instructions from active applications. By determining the optimum number of threads, the active applications can better utilize the processor's capabilities.

Figure 2:
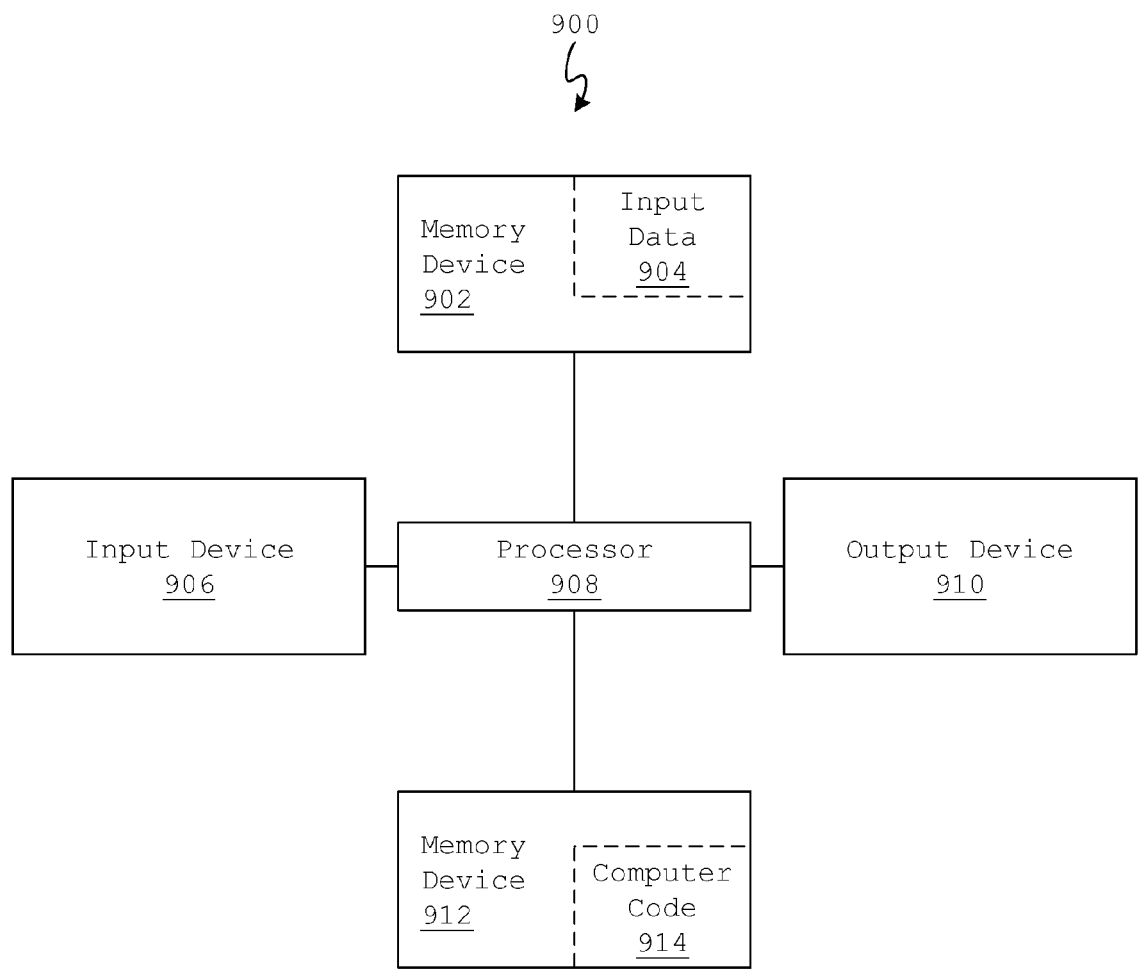
FIG. 2 illustrates a computer system which may facilitate a method for determining the number of threads for optimum system utilization, in accordance with embodiments of the present invention.

FIG. 2 illustrates a computer system 900 which may facilitate a method for determining a number of threads to maximize system utilization, in accordance with embodiments of the present invention.

The computer system 900 comprises a processor 908 (may have multiple cores), an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for determining the number of threads for optimum system utilization according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 2) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for determining a number of threads to maximize system utilization. Thus, the present invention discloses a process for supporting computer infrastructure, comprising integrating, hosting, maintaining and deploying computer-readable code into a computing system (e.g., computing system 900), wherein the code in combination with the computing system is capable of performing a method for determining a number of threads to maximize system utilization.

In another embodiment, the invention provides a business method that performs the process steps of the invention on a subscription, advertising and/or fee basis. That is, a service provider, such as a Solution Integrator, can offer to create, maintain, support, etc. a process for determining the number of threads for optimum system utilization. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 2 shows the computer system 900 as a particular configuration of hardware and software, any configuration of hardware and software, as would be known to a person of ordinary skill in the art, may be utilized for the purposes stated supra in conjunction with the particular computer system 900 of FIG. 2. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A computer program product, comprising a computer-usable storage device having a computer-readable program code stored therein, said computer-readable program code containing instructions that when executed by a processor of a computer system implement configuring a number of threads to maximize utilization of a system, said configuring the number of threads comprising:

determining a first value as being equal to a percentage of time in which said system is not waiting for instructions from at least one application;

determining a second value as being equal to a number of threads interacting with said system, said threads having been created by said at least one application;

determining a third value as being equal to a number of processor cores residing within said system; receiving from an end user a fourth value that represents a desired percentage of time in which said system is not waiting for instructions from said at least one application;

determining a fifth value $V_5$ as being equal to $V_5=(\ln(1-V_4)/\ln(1-V_1/V_3))V_2$, wherein $V_1$ is the determined first value, wherein $V_2$ is the determined second value, wherein $V_3$ is the determined third value, and wherein $V_4$ is the received fourth value, such that the determined fifth value $V_5$ represents a number of threads which if a total number of threads interacting with said system were equal to the determined fifth value $V_5$ would result in said percentage of time in which said system is not waiting for instructions from at least one application being equal to the received fourth value $V_4$; and after said determining said fifth value $V_5$, sending said fifth value $V_5$ to said at least one application that configures the number of threads based on the value $V_5$.

2. The method of claim 1, further comprising: repeating said determining said first value and said determining said second value and said determining said third value and said receiving said fourth value and said determining said fifth value and said sending said fifth value, said repeating being performed cyclically and according to a period of time having been provided by said end user prior to a first instance of said repeating.

3. The method of claim 1, further comprising: repeating said determining said first value and said determining said second value and said receiving said fourth value and said determining said fifth value and said sending said fifth value, said repeating being performed cyclically and according to a period of time having been provided by said end user prior to a first instance of said repeating.

4. The method of claim 1, further comprising: repeating said determining said first value and said determining said second value and said determining said third value and said determining said fifth value and said sending said fifth value, said repeating being performed cyclically and according to a period of time having been provided by said end user prior to a first instance of said repeating.

5. The method of claim 1, further comprising: repeating said determining said first value and said determining said second value and said determining said fifth value and said sending said fifth value, said repeating being performed cyclically and according to a period of time having been provided by said end user prior to a first instance of said repeating.

6. A computing system comprising a processor coupled to a computer-readable memory unit, said memory unit comprising a software application, said software application comprising instruction that when executed by said processor, implement configuring a number of threads to maximize utilization of a system, said configuring the number of threads comprising:

determining a first value as being equal to a percentage of time in which said system is not waiting for instructions from at least one application;

determining a second value as being equal to a number of threads interacting with said system, said threads having been created by said at least one application;

determining a third value as being equal to a number of processor cores residing within said system;

receiving from an end user a fourth value that represents a desired percentage of time in which said system is not waiting for instructions from said at least one application;

determining a fifth value $V_5$ as being equal to $V_5=(\ln(1-V_4)/\ln(1-V_1/V_3))V_2$, wherein $V_1$ is the determined first value, wherein $V_2$ is the determined second value, wherein $V_3$ is the determined third value, and wherein $V_4$ is the received fourth value, such that the determined fifth value $V_5$ represents a number of threads which if a total number of threads interacting with said system were equal to the determined fifth value $V_5$ would result in said percentage of time in which said system is not waiting for instructions from at least one application being equal to the received fourth value $V_4$; and after said determining said fifth value $V_5$, sending said fifth value $V_5$ to said at least one application that configures the number of threads based on the value $V_5$.

7. The computer program product of claim 6, further comprising: repeating said determining said first value and said determining said second value and said determining said third value and said receiving said fourth value and said determining said fifth value and said sending said fifth value, said repeating being performed cyclically and according to a period of time having been provided by said end user prior to a first instance of said repeating.

8. The computer program product of claim 6, further comprising: repeating said determining said first value and said determining said second value and said receiving said fourth value and said determining said fifth value and said sending said fifth value, said repeating being performed cyclically and according to a period of time having been provided by said end user prior to a first instance of said repeating.

9. The computer program product of claim 6, further comprising: repeating said determining said first value and said determining said second value and said determining said third value and said determining said fifth value and said sending said fifth value, said repeating being performed cyclically and according to a period of time having been provided by said end user prior to a first instance of said repeating.

10. The computer program product of claim 6, further comprising: repeating said determining said first value and said determining said second value and said determining said fifth value and said sending said fifth value, said repeating being performed cyclically and according to a period of time having been provided by said end user prior to a first instance of said repeating.

* * * * *